Figure 1:
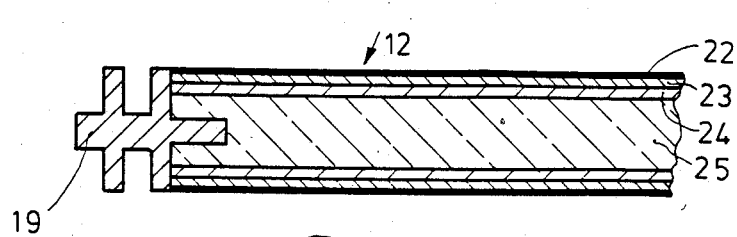

United States Patent [19]

Kayser

[11] Patent Number: 4,602,157
[45] Date of Patent: Jul. 22, 1986

[54] X-RAY IMAGE RECORDING DEVICE

[75] Inventor: Harald Kayser, Wedel, Fed. Rep. of Germany

[73] Assignee: U.S. Philips Corporation, New York, N.Y.

[21] Appl. No.: 576,493

[22] Filed: Feb. 2, 1984

[30] Foreign Application Priority Data

Feb. 21, 1983 [DE] Fed. Rep. of Germany ....... 3305912

[51] Int. Cl.⁴ .............................................. G01T 1/10
[52] U.S. Cl. ................... 250/327.2; 378/172
[58] Field of Search .................... 250/327.2; 378/172, 378/173

[56] References Cited

U.S. PATENT DOCUMENTS

| | | | |
|---|---|---|---|
| 2,999,159 | 9/1961 | Curry | 378/172 |
| 4,315,318 | 2/1982 | Kato et al. | 364/515.1 |
| 4,394,771 | 7/1983 | Charrier | 378/172 |
| 4,439,682 | 3/1984 | Matsumoto et al. | 250/327.2 |
| 4,439,866 | 3/1984 | Kato et al. | 378/19 |
| 4,543,479 | 9/1985 | Kato | 250/327.2 |

FOREIGN PATENT DOCUMENTS 77678 4/1983 European Pat. Off. ......... 250/327.2

Primary Examiner—Bruce C. Anderson
Assistant Examiner—Constantine Hannaher
Attorney, Agent, or Firm—Jack E. Haken

[57] ABSTRACT

The invention relates to an X-ray image recording device which comprises so-called latent image storage means which are capable of storing an image which, after stimulation can be sequentially read out in a read-out station, followed by erasure in an erasing station, so that the same image storage means can be used again. The image storage means is provided on the side surface of a preferably prismatic body which can be rotated to three different positions in which the image storage means can be exposed, read-out and erased, respectively.

5 Claims, 12 Drawing Figures

X-RAY IMAGE RECORDING DEVICE

The invention relates to an X-ray image recording device, comprising an image storage means for storing the X-ray shadow image, a read-out station for reading out the image stored in the image storage means, and an erasing station for erasing the residual image still present in the image storage means.

An "image storage means" is to be understood to mean herein a fluorescent material which is deposited on an appropriate, flat substrate and which is suitable for the latent storage of an X-ray shadow image which, after stimulation by light, can be converted into a visible image. Image storage means of this kind are known (see German patent document No. 29 28 244).

An X-ray image recording device comprising such image storage means is known from European patent application No. 56 639; for the recording of an X-ray image by means of this device, the image storage means is transported from a feed magazine, containing several of such image storage means, to the recording position in which it is exposed to X-rays. After exposure, the image storage means is transported either to a receiving magazine or directly to a read-out station. In the read-out station the image storage means is stimulated by light so that it emits radiation whose intensity corresponds to the intensity of the X-rays at the relevant location during the preceding X-ray exposure. The wavelength of the emitted light may also be shorter than that of the stimulating light.

A read-out station of this kind is disclosed in U.S. Pat. No. 4,315,318. Therein, the individual points of the image storage means are irradiated by means of a laser in order to cause the emission of light. Via light conductor array, the emitted light is applied to a photoelectric converter which produces an electric signal which corresponds to the brightness of the emitted light or the intensity of the X-rays at this point. The signal can be applied to a signal processing device which comprises a computer and which converts the information contained in the variation in time of the electric signal into a two-dimensional image.

The advantage of the use of such image storage means over the silver halide photographic materials customarily used for X-ray image recording consists in that such means are reusable. Before reuse (and after the described reading out of the image), however, the residual image must be erased. Therefore, it is necessary to transport the image storage means from the read-out station to an erasing station in which the image storage means are intensely irradiated by a light source for a prolonged period of time. The known device comprises a light source which briefly irradiates the image storage means when it enters the recording position, but this irradiation merely serves to erase the preexposures caused by inherent radiation or cosmic rays. The residual image remaining after the reading out of a recorded X-ray image cannot be erased in this manner.

It is the object of the invention to provide an X-ray image recording device which simply enables a cyclic use (exposure-read-out-erasure-exposure etc.) of the image storage means.

Based on a device of the kind set forth, this object is achieved in that there is provided a preferably prismatic body which carries an image storage means on at least one of its side surfaces and which can be rotated to at least three different positions about an axis which is symmetrically situated with respect to its side surfaces, the body, the recording position, the read-out station and the erasing station being arranged so that when the body is rotated to the various positions, the image storage means cyclically and successively enters the recording position, or a transport device to the recording position, the read-out station, and the erasing station.

The image storage means is thus provided on one or more side surfaces of the body, the axis of rotation extending through both base surfaces thereof which are interconnected by the side surfaces, said body preferably being shaped as a right prism. The image storage means is transported to the various stages of the processing cycle (recording, reading out, erasing) by rotating the body about its axis. Instead of being output physically, the X-ray images are output or transported to an image display device in the form of signals which are supplied by the read-out station.

If only one side surface of the body were provided with an image storage means, it would be necessary to rotate the body to at least three different angular positions between two X-ray exposures. However, if the body is provided with an image storage means on each of at least three side surfaces, fewer rotations will be required: while one image storage means is in the read-out station, the residual image of another image storage means (remaining after the passage through the read-out station) can already be erased in the erasing station.

A further embodiment of the device in accordance with the invention comprises at least three plates which are impermeable to light and X-rays and each of which is provided with an image storage means on both sides, the body comprising apertures wherethrough the inner side of the image storage means can be illuminated by the illumination device of the erasing station which is arranged inside the body, the plates being rotatable through 180° about an axis which extends parallel to the plane of the plates. It is thus achieved that, after having passed the read-out head, each image storage means can be exposed to the light of the light source of the erasing station inside the body for a prolonged period of time. When the plate comprising image storage means on both sides is turned over in the position of the prismatic body which directly precedes the recording position, it is also ensured that subsequently, i.e. after the prismatic body has been rotated one step further, the beam path is entered by an image storage means which has been exposed to the light of the light source inside the prismatic body immediately before that, so that the image storage means is free from residual images and the like.

The invention will be described in detail hereinafter with reference to the accompanying diagrammatic drawing.

Figure 3:
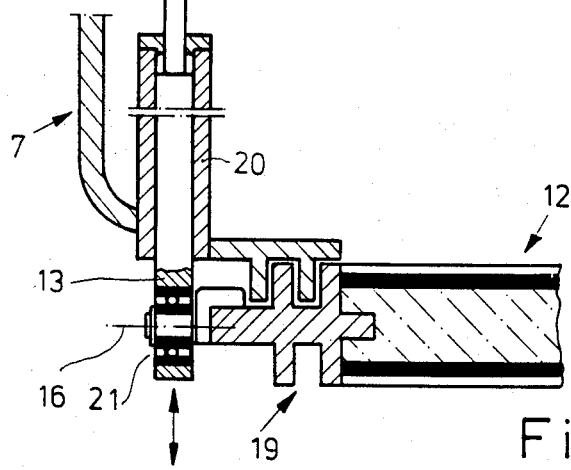
Figure 7:
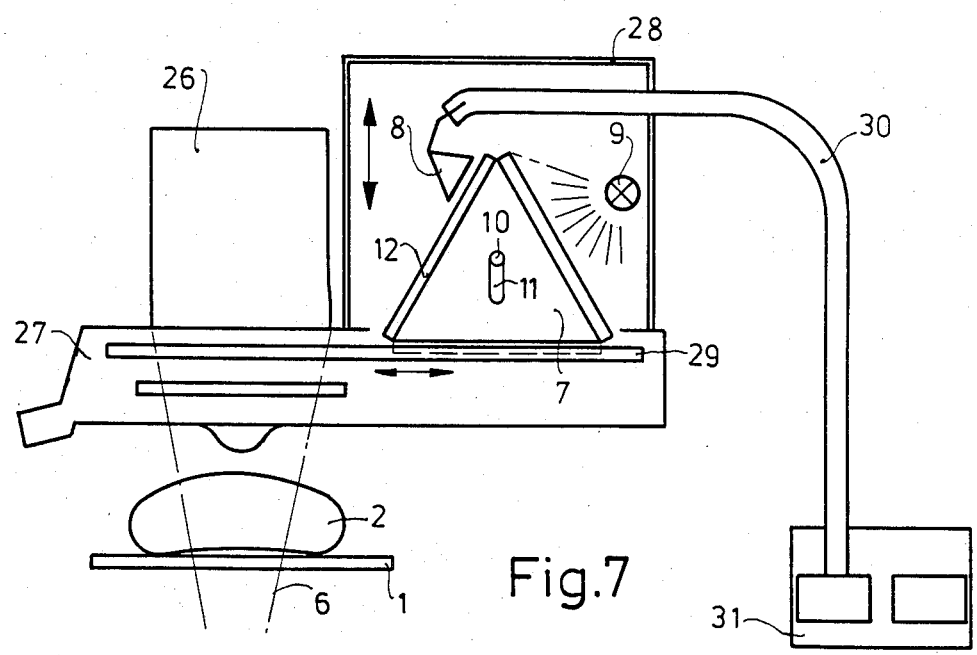
Figures 2, 4:
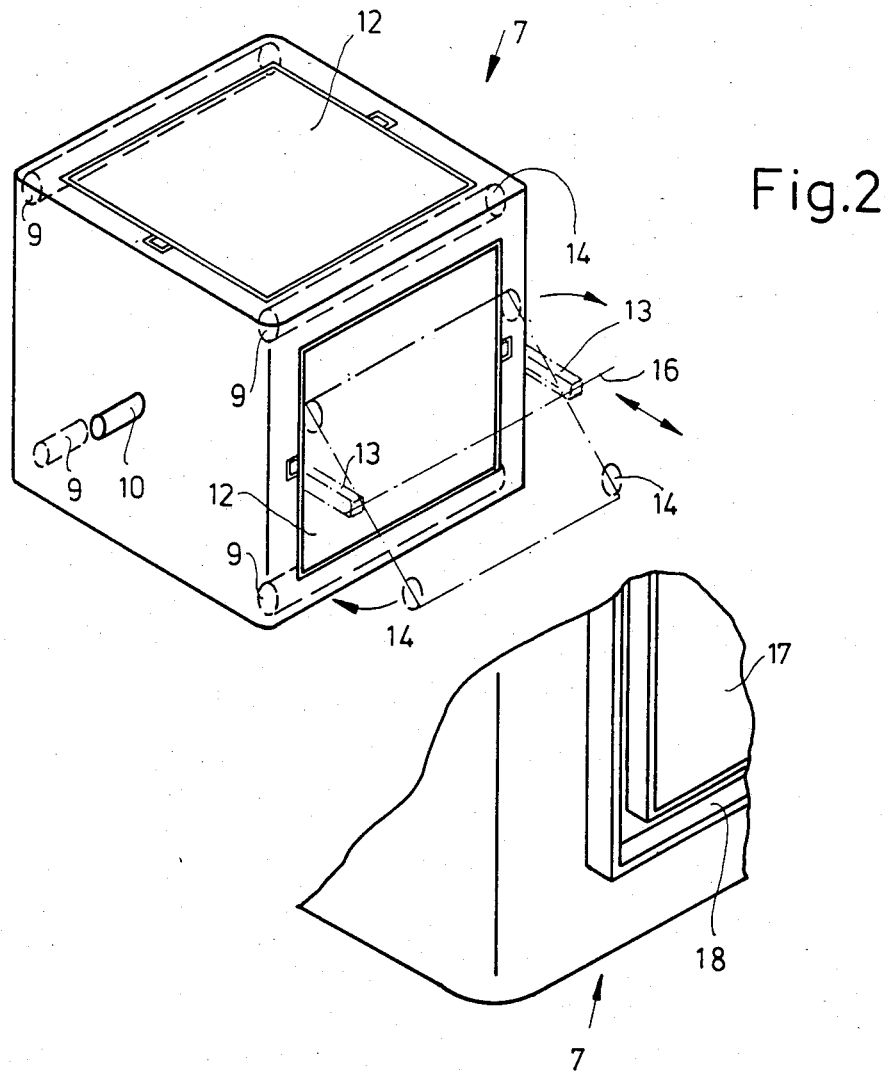
Figure 5:
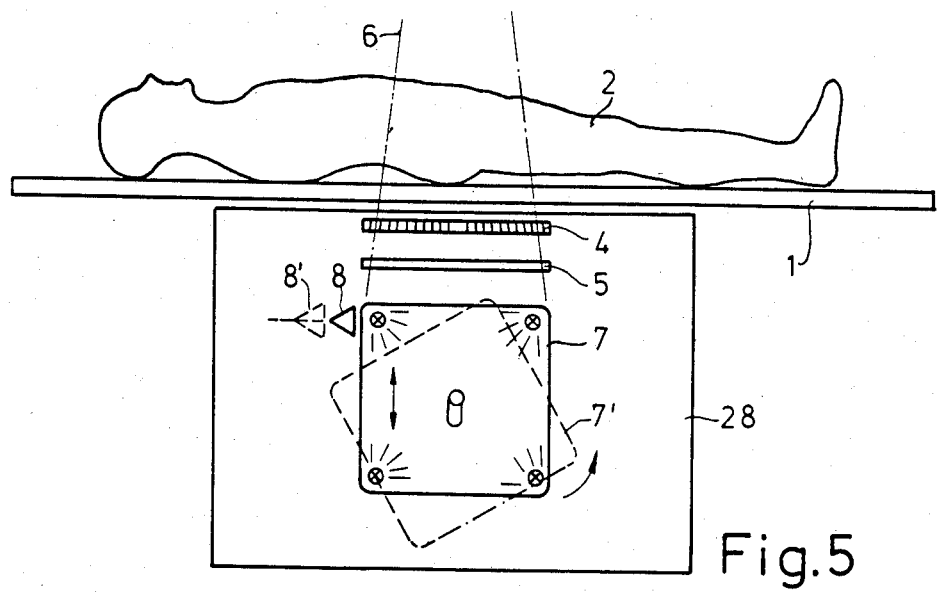

FIG. 1 shows a plate provided with image storage means on both sides,

FIG. 2 shows a cubic body comprising an image storage means on each of its four side surfaces, FIG. 3 is a cross-sectional view of a part of this body, FIG. 4 shows a part of the body at an increased scale, FIG. 5 shows a first embodiment of an X-ray image recording device in accordance with the invention which comrpises a cube as shown in FIG. 2, FIGS. 6a to 6f illustrate the various stages during rotation from one angular position to the next, and FIG. 7 shows an X-ray spotfilm device comprising a further embodiment in accordance with the invention.

FIG. 1 is a cross-sectional view of a plate 12 which can be used in a device in accordance with the invention and which is provided with an image storage means 22 on each of its external surfaces. The size of these image storage means may be, for example 43×43 cm; the means contain a fluorescent material which is suitable for the latent storage of the image and which belongs, for example to the group of alkaline-earth metal fluorohalides. Fluorescent materials of this kind are known from German patent document No. 29 28 244. Each of the image storage means 22 is provided on a flat brass plate 23, each of which is connected to a lead plate 24. The lead plates 24 serve to prevent the simultaneous exposure of both image storage means by an X-ray source arranged at one side of the plate 12. Between the lead plates 24 there is provided a foam core 25. This sandwich-like construction is enclosed by a profiled aluminium strip 19 on the outside.

FIG. 2 shows a body in the form of a cube 7 which is provided with a trunnion 10 in the centre of each of two opposite sides (because of the perspective, the drawing shows only one trunnion), said trunnions defining an axis of rotation for the cube 7. On each of the other four side surfaces of the cube there is provided a plate 12. As appears from FIG. 4, showing a part of the cube 7 at an increased scale, each side surface supporting a plate comprises an opening 17 which is enclosed by the strip 18 in which the aluminium strip 19 of the plate 12 engages (see FIG. 3), so that the strips 18 and 19 form a labyrinth which has a meander-like cross-section and which provides a light tight seal between the interior of the cube and the surroundings.

As appears from FIG. 3, the aluminium strip 19 of the plate 12 is connected to a ball-bearing 21 at the centre of each of the two sides of the plate 12 which extend perpendicularly to the axis of rotation, said ball-bearing being connected to an arm 13 which is slidable in a rail 20 which projects into the interior of the cube. The rail may alternatively be arranged outside the cube. The arm 13 can be displaced in the rail by means of a pneumatic drive. Via the arm 13, the plate 12 can thus be displaced outwards in the direction perpendicular to the side surface and, via the ball-bearing 21, the plate can also be rotated about an axis 16 which is parallel to the axis of the trunnions 10. In order to enable this rotation, the sides of the plate 12 which are connected to the arms 13 are provided with carriers 14 as diagrammatically shown in FIG. 2.

Inside the cube 7 tubular light sources 9 are arranged at the area of the cube edges which are parallel to the axis of rotation; these light sources can be connected to a suitable voltage source via tappings (not shown) and illuminate the surfaces of the four plates 12 which face the interior of the cube, so that residual images present thereon are erased. The interior of the cube 7 and the light sources 9 thus form the erasing station.

FIG. 5 shows a moving grid X-ray image recording apparatus which comprises a horizontal tabletop 1 on which a patient 2 is positioned, and a lighttight housing 28 which supports the tabletop and in which the cube shown in FIG. 2 is arranged. The patient is irradiated by an X-ray beam 6 which lands on the cube 7 via a scatter grid 4 and an ionization chamber 5, i.e. on the outwards facing image storage means of the upper plate 12 at that instant. Adjacent the cube 7 there is arranged the read-out station 8 (diagrammatically shown) whose construction may be as described in U.S. Pat. No. 4,315,318. The read-out station outputs an electric (or optical) signal which corresponds to the intensity of the light emitted by the individual points of the image storage means after stimulation by a suitable optical radiation source, and hence also to the intensity of the X-rays whereto the points in question were previously exposed. As has already been described, the erasing station is formed by the light sources 9 which illuminate the image storage means on the inner side of the four plates 12, so that any latent residual images present therein are erased.

An image storage means is transported from the recording position to the read-out station by a rotary step during which the cube is rotated through 90° with respect to the axis of rotation which is defined by the trunnions 10 and which extends perpendicularly to the plane of drawing in FIG. 5, so that the image storage means previously present in the recording position (top) is then situated at the left-hand side of the cube in order to be scanned in the read-out station 8. For the transport of an image storage means from the read-out station to the erasing station and back to the recording position, each time one of the plates is turned over in addition to the described rotation.

In order to ensure that the cube does not collide with the ionization chamber 5 or the read-out station 8 during the rotation about its axis, the read-out station 8 is displaced and the cube is lowered as indicated by the references 7' and 8'. It is also possible to lower the cube obliquely to the right so that the read-out station 8 can retain its position.

Figures 6A, 6B, 6C:
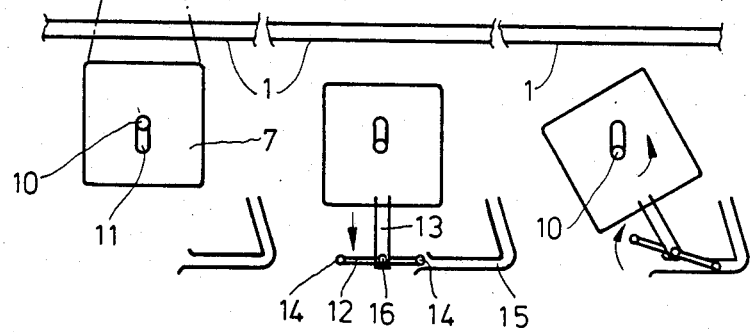

FIG. 6 illustrates the various phases of a rotation of the cube through 90°. FIG. 6a shows the position of the cube during recording. After the recording, the cube is lowered. To this end, the trunnions 10 about which the cube is rotated are guided in an elongated hole 11 in a holding device (not shown). After the lowering of the cube, the trunnion 10 is thus situated at the lower extremity of the elongated hole 11 (FIG. 6b). At the same time the arms 13 via which the plate 12 at the lower side of the cube is journalled are displaced downwards, so that one of the pairs of journals 14, provided near the ends of the plate 12, is situated at the entrance of guide rails 15 which are arranged one behind the other in the direction perpendicular to the plane of drawing at such a distance from one another that the plate 12 can be accommodated therebetween.

Figures 6D, 6E, 6F:
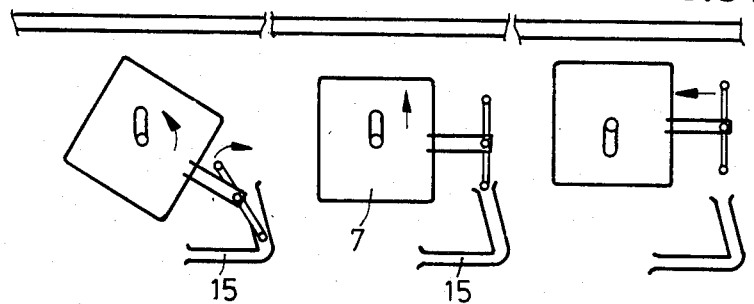

The cube is subsequently rotated counter-clockwise about the axis of the trunnions 10, the journals 14 in the angled guide rail thus being displaced further, i.e. initially to the right (FIGS. 6c and 6d). The plate 12 is thus rotated clockwise about the axis 16 (FIG. 3). The guide rails 15 are arranged and shaped so that, after a 90° rotation of the cube, the pair of journals 14 reaches the end of the guide rail after rotation of the plate through 180° with respect to the axis 16 (FIG. 6e).

Subsequently, the arm 13 is inserted again and the cube 7 is raised (FIG. 6f), so that it again occupies the position shown in FIG. 6a, the only difference being that it has now been rotated through 90° and that the plate which is situated at the right-hand side after completion of the rotation has been rotated through 180°.

During this rotation, the light sources 9 are preferably switched off, so that the light cannot escape past the lowered plate 12. However, these light sources remain switched on for the remainder of the time, so that each of the image storage means is illuminated during the period of time expiring between four X-ray exposures; this usually suffices for complete erasure of any residual images present in the image storage means. The heat developed by the light sources 9 is discharged from the interior of the cube via a lighttight ventilation system which will not be described herein.

The image storage device which is turned outwards by the turning over of the plate 12 reaches the recording position already after the next X-ray exposure. Consequently, the period of time expiring between the illumination of this image storage means by the light source 9 and the X-ray exposure is comparatively short, so that generally no disturbing fog can be built up during this period. However, should an inadmissibly long period of time have expired due to a pause or the like, a further rotation through 90° can be performed immediately before the next X-ray exposure.

FIG. 7 shows a part of an X-ray spotfilm apparatus which comprises an X-ray image recording device in accordance with the invention, corresponding elements being denoted by the same reference numerals as used in the FIGS. 1 to 6. The X-rays pass through an object 2 arranged on a tabletop 1 and land on the entrance screen of an image intensifier 26 which is supported by the X-ray spotfilm apparatus. Adjacent the image intensifier, a prismatic body 7 having a triangular cross-section is arranged in a lighttight housing 28, said body supporting a plate 12 on each of its side surfaces; contrary to the plate shown in FIG. 1, the plate 12 now comprises an image storage means only on its outer side. The body is rotatable about an axis 10 in steps of 120°, so that each time one of the plates 12 which is detachably connected to the body can be engaged by a transport device which consists of a rail 29 and drive means (not shown) for the displacement of the plate 12 in the transport rail 29 into the beam path in front of the entrance surface of the image intensifier. The read-out station 8, being coupled to an appropriate signal processing device 31 via an electrical or fibre optical conductor 30, is arranged so that it can point-wise scan the X-ray image formed on another plate during a preceding exposure so that it can be converted into electric or optical signals, whilst the erasing station (symbolized by the light source 9) illuminates the plate arranged on the third side surface of the body 7, thus erasing any residual image remaining thereon after the passage through the read-out station 8.

After the detachment of the front plate from the body 7, followed by the transport into the beam path and reconnection to the body, the body is again rotated through 120°, after which the plate previously situated at the erasing station is transported to the recording position via the transport rail 29, whilst the plate previously exposed is read out by the read-out station and the residual image on the plate previously present in the read-out station is erased in the erasing station 9.

What is claimed is:

1. In an X-ray image recording device, comprising image storage means for storing X-ray shadow images, a read-out station for reading out the images stored in the image storage means, and an erasing station for erasing residual images present in the image storage means, the improvement, comprising:
    a prismatic body having at least three sides surfaces, which carries the image storage means on said side surfaces and which can be rotated to present said side surfaces at at least three different positions about a first axis of rotation, said first axis being symmetrically situated with respect to said side surfaces;
    at least three planar two-sided plates, the image storage means being disposed on both sides of each of said plates, each of the plates being impermeable to light and to X-rays, disposed on a corresponding side surface of the prismatic body, and rotatable through 180° about a second axis which is parallel to the plane of the plate so that in a first position of each plate a first side thereof is directed toward the interior of the body and in a second position thereof the second side is directed toward the interior of the body; wherein
    the erasing station comprises illuminating means disposed within the body;
    the sides of the body define apertures which expose the inwardly directed side of at least one plate to the illuminating means; and
    the body, an image storage means, the read-out station, and the erasing station being arranged so that when the body is rotated to the various positions about the first axis, image storage means cyclically and successively enter the storage means, the read-out station, and the erasing station.

2. A device as claimed in claim 1, wherein:
    each of the plates further comprise catch means (14); and
    the device further comprises guide rail means (15) which function to engage and displace the catch means on each of the plates whereby the plates are rotated through 180° about its second axis of rotation as the body is rotated from one position to another about the first axis of rotation.

3. A device as claimed in claim 2 or claim 1, wherein the body includes image storage means on each of at least three sides.

4. A device as claimed in claim 3, wherein the body is a cube having four sides each of which is parallel to the axis of rotation and includes image storage means.

5. A device as claimed in claim 1, wherein the body is slidable in the direction perpendicular to the first axis of rotation.

* * * * *